May 12, 1925.
R. E. MANLEY
TOWING POLE
Filed Aug. 18, 1923
1,537,249
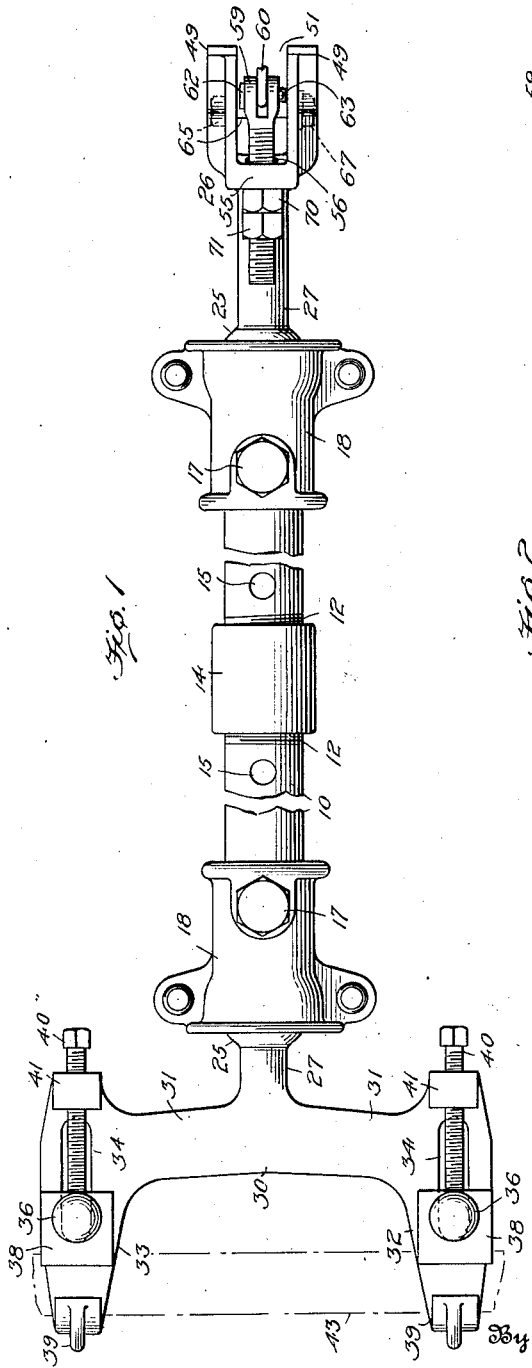
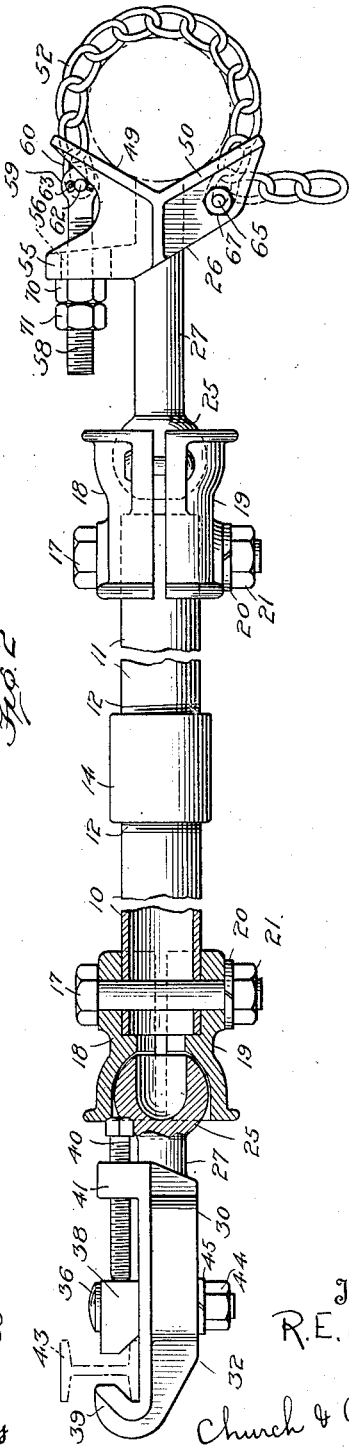
Inventor
R. E. Manley
Church & Church
His Attorneys Patented May 12, 1925.

1,537,249

UNITED STATES PATENT OFFICE.

ROBERT E. MANLEY, OF YORK, PENNSYLVANIA.

TOWING POLE.

Application filed August 18, 1923. Serial No. 658,080.

*To all whom it may concern:*

Be it known that I, ROBERT E. MANLEY, a citizen of the United States, residing at York, in the county of York and State of Pennsylvania, have invented certain new and useful Improvements in Towing Poles; and I do hereby declare the following to be a full, clear, and exact description of the same, reference being had to the accompanying drawing, forming part of this specification.

This invention relates to a device for use between two automobiles so that a forward automobile may tow the rearward one. The principal object of the present invention is to provide a simple and efficient towing pole of this general nature which will permit of freedom of movement between the two vehicles so that the towing vehicle may make certain turns with respect to the towed vehicle such as are not permissible with the usual towing equipment.

In the drawings,

Figure 1 is a general plan view of the towing pole.

Fig. 2 is a side elevation thereof.

The towing pole pipe is preferably in two sections such as 10 and 11 each threaded as at 12 to receive a standard coupling 14 whereby a unitary pole may be formed. In order to facilitate rapid assembly at a point away from the tools I find it convenient to perforate each pipe as at 15 in proximity to the threads 12 to receive a rod of any nature in order that the pipes may be quickly and firmly screwed together when coupling. At the free end each pipe section is perforated to receive a bolt 17 which fastens the sections 18 and 19 of the universal joint socket to the towing pole and receiving in accordance with proved custom a lock washer 20 and nut 21. These two cooperating universal joint socket members 18 and 19 when clamped on the pole provide a socket in which is received a ball member 25 connected to the rear axle clamp 26 by the bar or rod 27 integral with the ball and clamp.

The connections at the rear end of the towing pole are exactly similar save that at this end the rod or bar 27 is integral with a front axle clamp 30 preferably consisting in a bracket 31 at right angles to the bar 27 and having at its widely spaced ends a pair of substantially parallel arms 32 and 33 each slotted as at 34 to permit movement in a line parallel to the axis of the towing pole of a bolt 36 carrying at its upper and headed end a movable jaw 38 cooperating with the stationary jaw 39 preferably integral with the arm 32 or 33. The jaw 38 is moved toward the stationary jaws 39 by means of a set screw 40 rotatably engaging a lug 41 preferably integral with the arm 32 or 33 and when the jaws are in desired relation to the article to be gripped, for example the front axle 43, the jaw 38 is locked in place by the nut 44 preferably carrying a lock washer 45.

The rear axle clamp 26 which is located at the front end of the towing pole is preferably of the configuration best illustrated in Fig. 2. The jaws 49 and 50 are angularly disposed with relation to one another and are each slotted as at 51 to receive a chain 52 of such length as to embrace any desired portion of a rear axle assembly. A comparatively large and sturdy lug 55 arises from the main portion of the clamp and is perforated as at 56 to receive a chain tightening bolt 58 having at its free forward end a slotted head 59 forming a fork between the tines of which the link 60 at one end of the chain 52 may be secured by means of a flat headed pin 62 preferably secured in the fork 59 as by the cotter pin 63. The lower jaw of the clamp 26 is transversely perforated to receive a bolt 65 which in use is passed through a link of the chain when the bolt 58 is projected forwardly a convenient distance and the chain 52 drawn tightly in place about the article to be clamped. The nut 67 of the bolt 65 is now secured in place and the chain 52 is drawn taut by means of the nut 70 on the bolt 58 and when the proper degree of tightness has been obtained the lock nut 71 is tightened in the usual manner. Since the jaws 49 and 50, the clamp 26, rod 27 and ball 25 are all integral it will be seen that upon proper tightening of the chain 52 about a rear axle housing for example an absolutely rigid connection is had between the article clamped and the ball within the socket of the nearest universal joint.

What I claim is:

1. A towing pole clamp comprising a pair of widely separated, substantially parallel arms, a bracket integral with said arms, a pair of relatively movable jaws on each of said arms, and pivotal means for connecting said bracket to a towing pole.

2. In a towing pole clamp, a plurality of spaced stationary jaws, independently movable cooperating with each of said stationary jaws to grip an axle between them, a towing pole, a socket member secured to said towing pole, a ball within said socket, and means for rigidly securing said ball and said stationary jaws.

3. In combination, a plurality of towing pole pipe sections, means for securing said sections end to end, a ball and socket member connected to the free end of each of said sections, a clamp secured to one of said balls and having a plurality of jaws independently movable in parallel paths and a clamp secured to the ball at the other end of the towing pole.

4. In combination, a towing pole, a two-piece universal joint socket detachably secured to each end of the towing pole, a ball within each universal joint socket, a plurality of adjustable clamps, and rigid spacing means integral with each of said clamps and one of said balls whereby a rigid and immovable connection may be secured between the article clamped at each end of the towing pole and the cooperating ball.

5. In combination, a front axle clamp comprising a bracket, a plurality of relatively movable jaws at each side of said bracket, a ball, and means integral with said bracket and said ball rigidly connecting them; a rear axle clamp comprising a plurality of diverging jaws, a flexible member adjustably secured to one of said jaws and detachably secured to the other of said jaws, a second ball, and a rigid connection between said rear axle clamp and said second ball; a towing pole, and a universal joint socket at each end of said towing pole each engaging one of sail balls.

6. A towing pole clamp having a horizontal shaft, a plurality of slotted jaws each angularly disposed with respect to said shaft, adjustable means for securing one end of a chain to the rear of one of said jaws, detachable means on the other jaw for engaging a link of said chain, and pivotal means for attaching said clamp to a towing pole.

7. In combination, a ball, a clamp comprising a plurality of jaws adapted to receive an axle housing, a rigid bar connecting said ball and clamp, and means for detachably but rigidly securing said clamp to said axle housing whereby said ball is secured in relatively immovable relation with said axle housing.

ROBERT E. MANLEY.